US007604860B2

(12) United States Patent
Kim et al.

(10) Patent No.: US 7,604,860 B2
(45) Date of Patent: Oct. 20, 2009

(54) HIGH TENSILE NONMAGNETIC STAINLESS STEEL WIRE FOR OVERHEAD ELECTRIC CONDUCTOR, LOW LOSS OVERHEAD ELECTRIC CONDUCTOR USING THE WIRE, AND METHOD OF MANUFACTURING THE WIRE AND OVERHEAD ELECTRIC CONDUCTOR

(75) Inventors: Byung Geol Kim, Seoul (KR); Shang Shu Kim, Daegu (KR); Byung Chul Woo, Changwon (KR); Hee Woong Lee, Changwon (KR); Ju Hwan Park, Busan (KR); Yong Keun Jeong, Busan (KR); Min Bum Lee, Busan (KR); Sun Hwan Ahn, Yangsan (KR)

(73) Assignees: Korea Sangsa Co., Ltd., Yangsan, Kyungsangnam-do (KR); Korea Electro Technology Research Institute, Chanwon, Kyungsangnam-do (KR)

( * ) Notice: Subject to any disclaimer, the term of this patent is extended or adjusted under 35 U.S.C. 154(b) by 69 days.

(21) Appl. No.: 10/853,080

(22) Filed: May 25, 2004

(65) Prior Publication Data

US 2005/0266240 A1 Dec. 1, 2005

(51) Int. Cl.
*B32B 15/18* (2006.01)
*B32B 15/20* (2006.01)
*C22C 38/58* (2006.01)
*H02G 7/00* (2006.01)

(52) U.S. Cl. ......................... 428/379; 428/375; 420/89; 420/90; 420/91; 420/119; 420/128

(58) Field of Classification Search ................... 420/89, 420/90, 91, 103, 119, 128
See application file for complete search history.

(56) References Cited

U.S. PATENT DOCUMENTS 3,167,857 A * 2/1965 Saito et al. .................. 228/125
3,813,481 A * 5/1974 Adams ........................ 174/130
4,416,508 A * 11/1983 Dey et al. .................. 385/110
4,436,954 A * 3/1984 Kaderjak et al. .......... 174/128.1
4,525,598 A * 6/1985 Tsukamoto et al. ...... 174/128.1

(Continued)

FOREIGN PATENT DOCUMENTS

JP 2003 56646 3/1991

(Continued)

OTHER PUBLICATIONS

JP10-144144 Machine Translation.*

*Primary Examiner*—Jill Gray
(74) *Attorney, Agent, or Firm*—Ladas & Parry LLP

(57) ABSTRACT

Provided are the high tensile nonmagnetic stainless steel wire for an low loss overhead electric conductor, the low loss overhead electric conductor using the high tensile nonmagnetic stainless steel wire as its core, and a manufacturing method of them respectively. The high tensile nonmagnetic stainless steel wire reduces a core loss and eddy current loss and minimizes effective electric resistance of the conductor by using the nonmagnetic stainless steel wire, that is a nonmagnetic material, rather than a high carbon steel wire, that is a strong magnetic material. In addition, an overall power transmission loss is minimized by strengthening the tensile strength of and reducing a sectional area of the steel wire, making an aluminium-welded layer thicker, and increasing the sectional area of an aluminium conductor.

2 Claims, 5 Drawing Sheets

U.S. PATENT DOCUMENTS

| | | | | | |
|---|---|---|---|---|---|
| 5,534,083 | A | * | 7/1996 | Chung et al. | 148/218 |
| 5,991,485 | A | * | 11/1999 | Kertscher et al. | 385/100 |
| 6,756,011 | B2 | * | 6/2004 | Koga et al. | 420/60 |
| 2002/0148537 | A1 | * | 10/2002 | Koga et al. | 148/327 |

FOREIGN PATENT DOCUMENTS

| | | | | |
|---|---|---|---|---|
| JP | 5-295486 | | | 11/1993 |
| JP | 2618151 | | | 11/1993 |
| JP | 5295486 | | * | 11/1993 |
| JP | 10144144 | A | * | 5/1998 |
| KR | 2002 0029539 | | | 4/2002 |
| RU | 2063080 | | | 6/1996 |

* cited by examiner

HIGH TENSILE NONMAGNETIC STAINLESS STEEL WIRE FOR OVERHEAD ELECTRIC CONDUCTOR, LOW LOSS OVERHEAD ELECTRIC CONDUCTOR USING THE WIRE, AND METHOD OF MANUFACTURING THE WIRE AND OVERHEAD ELECTRIC CONDUCTOR

BACKGROUND OF THE INVENTION

1. Field of the Invention

The present invention relates to high tensile stainless steel wire for an overhead electric conductor, the low loss overhead electric conductor using the same, and method of manufacturing the wire and overhead electric conductor.

2. Description of the Related Art

An overhead electric conductor is widely used in transmitting electric power from a power plant to a substation. However, power loss inevitably occurs during transmission in case of the overhead electric conductor, and thus, reducing power loss during power transmission is an urgent task.

As displayed in FIG. 1, several wires of aluminium or aluminium alloy conductor 3 in an outer circumference of a core of a steel wire strand 10 made of several wires of a zinc plated or aluminium-welded high carbon steel wire 1 are conventionally used for an overhead electric conductor. The high carbon steel wire 1 has a characteristics of ferromagnetic substance and tensile strength about 130 kg/mm$^2$.

However, in the conventional overhead electric conductor, a magnetic field derived from the high carbon steel wire during power transmission interferes a flow of currents and causes the electric resistance loss due to an increase of effective electric resistance in the aluminium conductor. Moreover, the core loss and eddy current loss of the high carbon steel wires, features peculiar to magnetic substance, discharge Joule heat, and thus, increase the temperature of the electric conductor and cause a fatal problem in its stability.

SUMMARY OF THE INVENTION

The present invention provides a high tensile nonmagnetic stainless steel wire for an overhead electric conductor and a low loss overhead electric conductor using the wire as its core.

In addition, the present invention provides a method of manufacturing the high tensile nonmagnetic stainless steel wire for an overhead electric conductor and the low loss overhead electric conductor using the wire as its core.

According to an aspect of the present invention, there is provided a high tensile nonmagnetic stainless steel wire for an low loss overhead electric conductor formed of 0.07 to 0.12% by weight of C, 0.05 to 1.00% by weight of Si, 4.5 to 12.0% by weight of Mn, 16.0 to 19.5% by weight of Cr, 2.5 to 6.0% by weight of Ni, 0.10 to 3.0% by weight Cu, 0.05 to 0.15% by weight of Nb, 0.20 to 0.40% by weight of N, 0.01 to 0.10% by weight of Al, the remaining percentage by weight of Fe and other inevitable impurities, based on a total weight of the steel wire.

The high tensile nonmagnetic stainless steel wire is welded with aluminium.

The high tensile nonmagnetic stainless steel wire is used as a core for a low loss overhead electric conductor.

The seven high tensile nonmagnetic stainless steel wires are stranded together and used as cores for a low loss overhead electric conductor.

According to another aspect of the present invention, there is provided a method of manufacturing a high tensile nonmagnetic stainless steel wire used as a core for a low loss overhead electric conductor, the method comprising: drawing low loss high tensile nonmagnetic stainless steel wire rods; and aluminium welding the high tensile nonmagnetic stainless steel wire which are drawn.

According to still another aspect of the present invention, there is provided a method of manufacturing an low loss overhead electric conductor including a high tensile nonmagnetic stainless steel wire core supporting an electric conductor and an aluminium or aluminium alloy conductor transmitting currents in an outer circumference of the core, the method comprising: drawing high tensile nonmagnetic stainless steel wire rods; aluminium welding the high tensile nonmagnetic stainless steel wire which are drawn; making the steel wire strand core in which 7 wires of the high tensile nonmagnetic stainless steel wires are stranded; and stranding the aluminium or aluminium alloy conductor in the outer circumference of the core.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention now will be described more fully with reference to the attached drawings, in which exemplary embodiments of the invention are shown.

This invention uses a high tensile nonmagnetic stainless steel wire strand with several wires with/without an aluminium welding as a core of a low loss overhead electric conductor, instead of a conventional zinc plated or aluminium-welded high carbon steel wire strand with several wires.

Main chemical components and a composition ratio by weight of the high tensile nonmagnetic stainless steel wire according to the present invention are disclosed in the below Table 1 in Japanese Patent Laid-open Publication No. 2618151.

TABLE 1

| Chemical component | C | Si | Mn | Cr | Ni | Cu | Nb | N | Al | Fe |
|---|---|---|---|---|---|---|---|---|---|---|
| Composition ratio (% by weight) | 0.07~0.12 | 0.05~1.00 | 4.5~12.0 | 16.0~19.5 | 2.5~6.0 | 0.10~3.0 | 0.05~0.15 | 0.20~0.40 | 0.01~0.10 | bal |

Stainless steel wire rods having the above composition ratio of the chemical components are repeatedly drawn with wire-drawing dies in order to have a tensile strength of 180 kg/mm$^2$ or more, elongation of 2.0% or more, and magnetic permeability of 1.02 μm or less. After impurities including lubricant on the surface of the drawn steel wire are completely eliminated by degreasing, an aluminium welding process is performed to a predetermined thickness. The stainless steel wire does not necessarily need the aluminium welding due to its excellent corrosion resistance, but the aluminium welding may increase its conductivity and corrosion resistance. This 7 aluminium-welded high tensile nonmagnetic stainless steel wires are stranded together and used as the core for the low loss overhead electric conductor according to the Korean industrial standard, KS D 7007.

Figure 1:
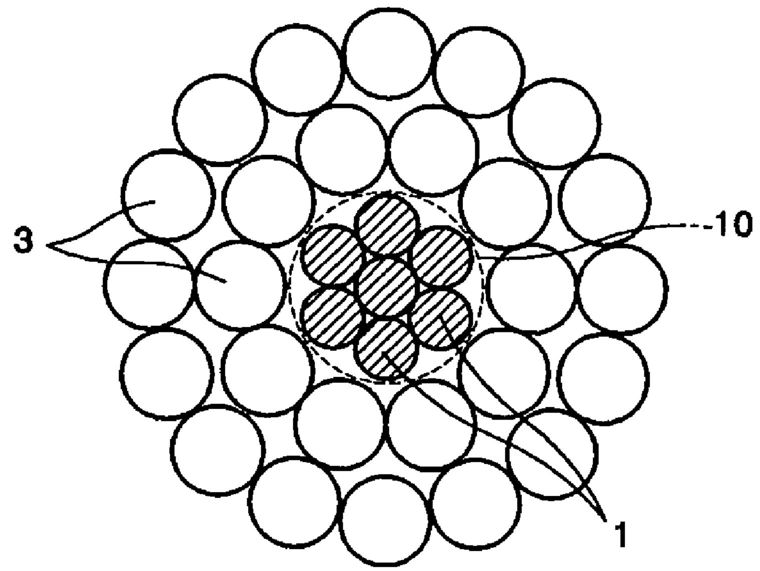
FIG. 1 (PRIOR ART)
FIG. 1 is a cross-section of a cylindrical aluminium conductor with a high tensile nonmagnetic stainless steel wire reinforced or a zinc plated high carbon steel wire reinforced according to a previously known method.
Figure 2:
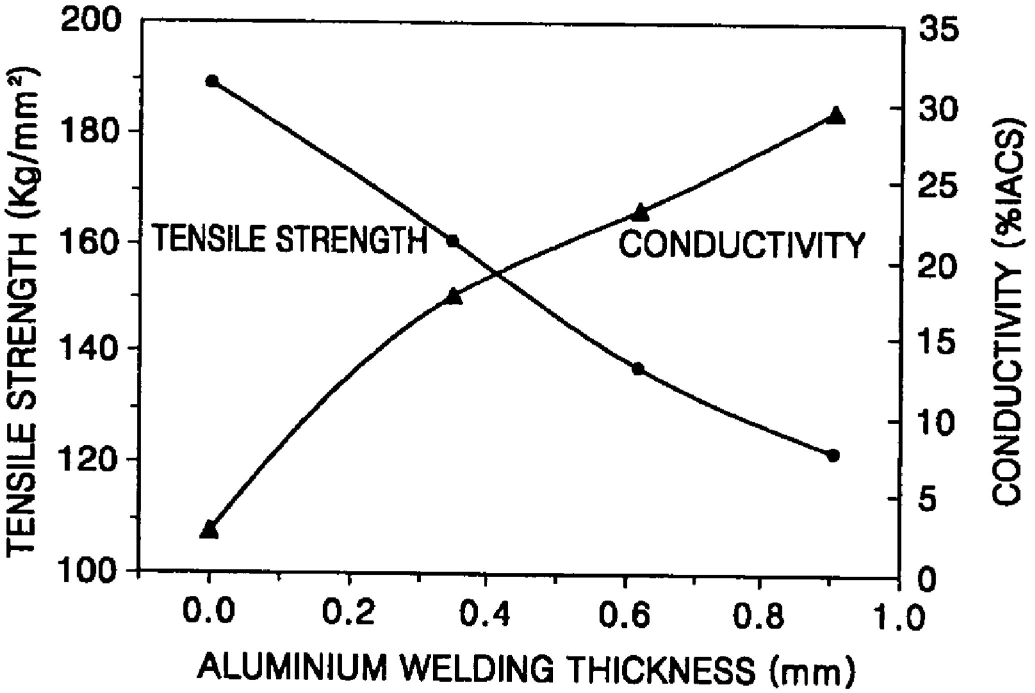
FIG. 2 is a graph illustrating relations between a tensile strength and elongation according to a thickness of aluminium welding in an aluminium-welded high tensile nonmagnetic stainless steel wire.

(1) Relations Between a Tensile Strength and Conductivity According to a Change in a Thickness of an Aluminium-Welded Layer FIG. 2 illustrates a change in conductivity and a tensile strength according to a thickness of aluminium welding in an aluminium-welded high tensile nonmagnetic stainless steel wire.

Referring to FIG. 2, if the aluminium-welded layer gets thicker, the conductivity of the stainless steel wire linearly increases, but the tensile strength linearly decreases. That is, as the aluminium-welded layer gets thicker, the conductivity of the stainless steel wire increases, but the tensile strength decreases due to a reduced sectional area of the stainless steel wire.

The high tensile nonmagnetic stainless steel wire has the tensile strength higher than the conventional high carbon steel wire. Therefore, compared to the conventional high carbon steel wire, the aluminium-welded high tensile nonmagnetic stainless steel wire maintains an equal or higher tensile strength, even though the thickness of the aluminium welding relatively gets thicker. This increases the conductivity of the aluminium-welded high tensile nonmagnetic steel wire.

As a result, the aluminium-welded high tensile nonmagnetic stainless steel wire maintains the tensile strength equal to or higher than the conventional high carbon steel wire with the thicker aluminum welding and increases the conductivity.

(2) Heat Test

In case of an overhead electric conductor, the temperature in an electric conductor increases by the occurrence of Joule heat resulting from electric resistance when the alternating electric current is applied in an overhead electric conductor. For the purpose of studying an influence of the above temperature increase, a change in the tensile strength of the steel wire in the broad temperature range of −50~300° C. is observed.

Figure 3:
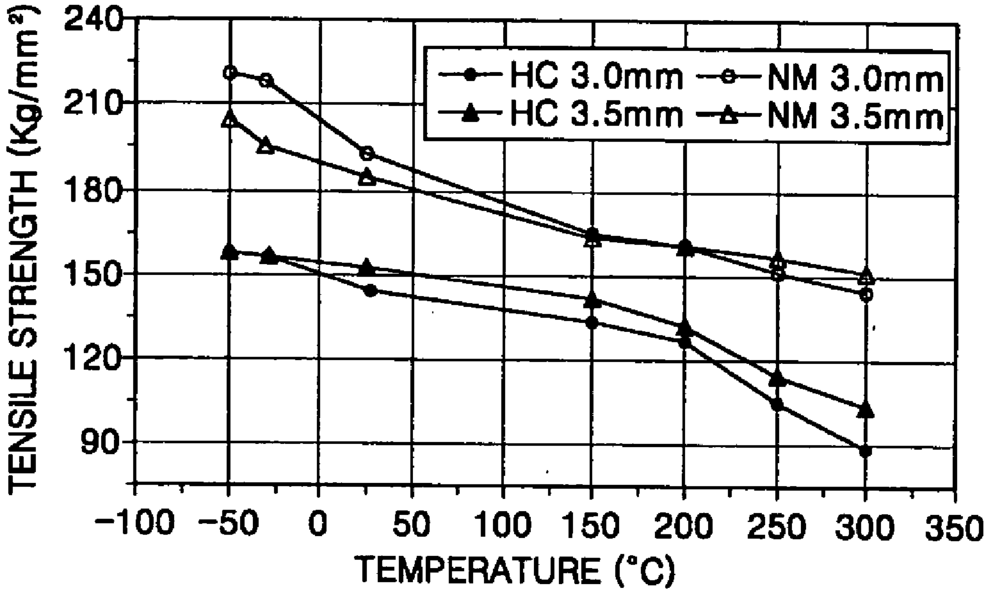
FIG. 3 a graph illustrating a change in a tensile strength of a high tensile nonmagnetic stainless steel wire and a high carbon steel wire according to a temperature change.

As described in FIG. 3, the high tensile nonmagnetic stainless steel wire (displayed in NM in the drawing) has a noticeably higher tensile strength compared to the high carbon steel wire (displayed in HC in the drawing).

Accordingly, if the high tensile nonmagnetic stainless steel wire is used as the core of the overhead electric conductor, a decline of the tensile strength is prevented and simultaneously, the thickness of the aluminium welding of the high tensile nonmagnetic stainless steel wire can be increased in comparison to that of a high carbon steel wire. Thus, the conductivity of aluminium-welded high tensile nonmagnetic stainless steel wire is higher than that of the aluminium-welded high carbon steel wire.

A maximum permissible temperature is set forth for the overhead electric conductor according to an adequate electric current capacity. The maximum continuous permissible temperature is generally limited to 90° C. in case of an aluminium conductor steel reinforced (ACSR). Therefore, it is important to understand a change in mechanical characteristics of the steel wire core when it is continuously used in a constant temperature as a support line in the ACSR. The ACSR should be lasted for nearly 20~30 years once it is installed, and thus it is impractical to get data of the change of mechanical characteristics of the ACSR for such a long period of time. Instead, one can perform a test of the ACSR by putting it in a temperature higher than that is actually used, for example, 150° C. for many hours and extracting its test data at each hour. Then, the change in the tensile strength according to the lapse of time is observed, and ultimately the mechanical characteristics for a long period of time can be forecasted using these extracted test data.

Figure 4:
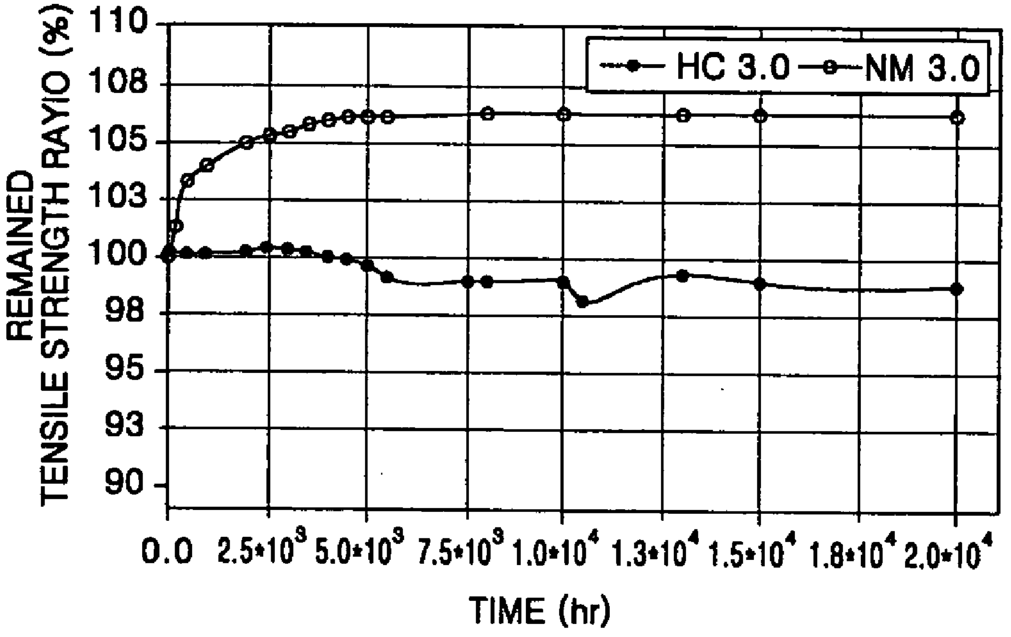
FIG. 4 is a graph illustrating a change in a remained tensile strength ratio as the lapse of time when a 3.0 mm high carbon steel wire and high tensile nonmagnetic stainless steel wire are maintained at 150° C.

FIG. 4 illustrates a change in a tensile strength of a high tensile nonmagnetic stainless steel wire and a high carbon steel wire as the lapse of time. Referring to FIG. 4, in case of the high tensile nonmagnetic stainless steel wire (displayed as a NM in the drawing), its tensile strength is increased up to 107% after 5,000 hours, and then is maintained as time passes. On the contrary, in case of the high carbon steel wire (displayed as a HC in the drawing), its tensile strength is remained to 100% during 5,000 hours, and then is slightly decreased as time passes.

Accordingly, the high tensile nonmagnetic stainless steel wire shows an excellent heat-resistance characteristic that can be used long time at a high temperature compared to the conventional high carbon steel wire.

(3) Salt Spray Test

The material of the core steel wire strand of overhead electric conductor installed near a seaside or a polluted area should have good corrosion resistance in order to prevent any unwanted corrosion accident.

Figure 5:
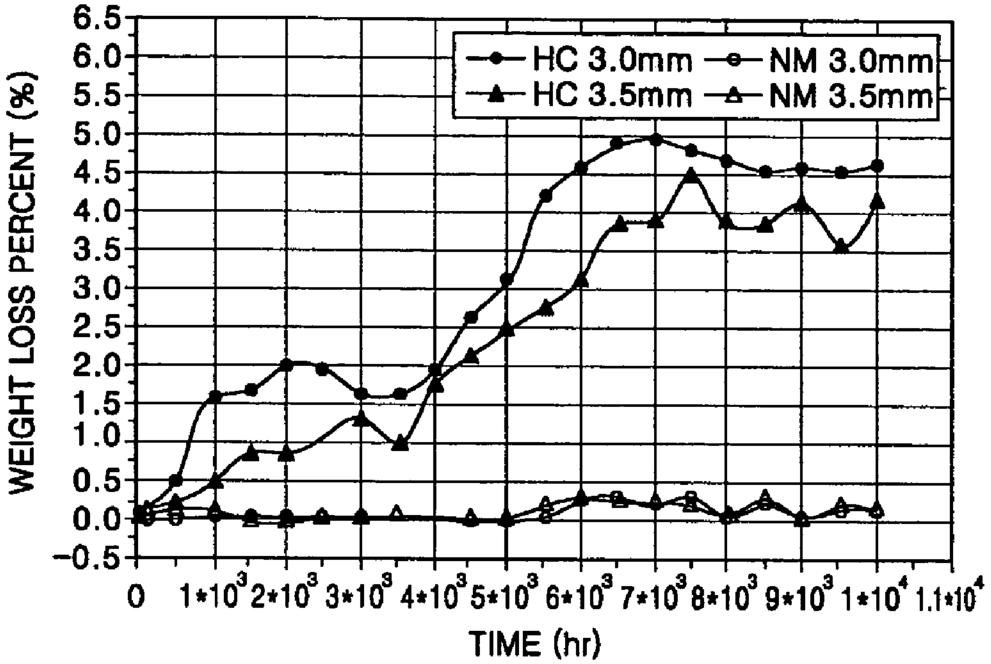
FIG. 5 is a graph illustrating a change in weight as the lapse of time when 3.0 mm and 3.5 mm high carbon steel wires and 3.0 mm and 3.5 mm high tensile nonmagnetic stainless steel wires are salt spray tested, respectively.

A salt spray test to evaluate on corrosion resistance of the high tensile nonmagnetic stainless steel wire and the zinc plated high carbon steel wire was performed. FIG. 5 is a graph illustrating a change in weight as the lapse of time when 3.0 mm and 3.5 mm high carbon steel wires and 3.0 mm and 3.5 mm high tensile nonmagnetic stainless steel wires are salt spray tested, respectively. As presented in FIG. 5, the high tensile nonmagnetic stainless steel wire (displayed as a NM in the drawing) does not show any weight change due to the corrosion, but the zinc plated high carbon steel wire (displayed as a HC in the drawing) illustrates a dramatic weight change due to the corrosion.

Therefore, the high tensile nonmagnetic stainless steel wire has the excellent corrosion resistance to salt water compared to the zinc plated high carbon steel wire. This characteristic is a very important measure in evaluating the stability of the overhead electric conductor.

(4) Fatigue of the Core Steel Wire

A constant tension load is always applied to the overhead electric conductor that is mounted on an insulator of the steel tower. Thus, the core of the steel wire is exposed to complex and multiple loads such as the tension, bending, and torsional load. Under this circumstance, it is essential to secure a fatigue resistant characteristic to stand complex and multiple loads.

Figure 6:
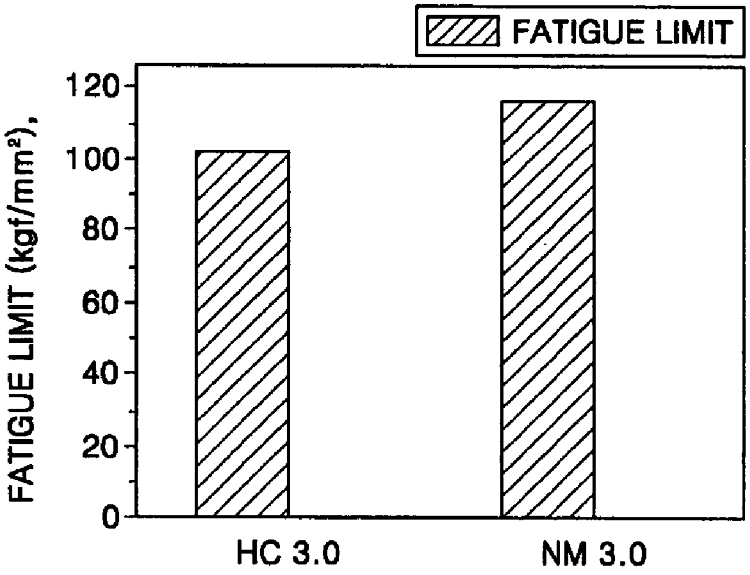
FIG. 6 is a graph comparing characteristics of tensile and tensile fatigue of a high carbon steel wire and a high tensile nonmagnetic stainless steel wire.

FIG. 6 shows a tension-tension fatigue characteristic of a 3.0 mm high tensile nonmagnetic stainless steel wire and a 3.0 mm zinc plated high carbon steel wire. The tension-tension fatigue test is performed using a 10 ton Instron hydraulic testing machine and a strain is measured using a extensometer. As presented in FIG. 6, the high tensile nonmagnetic stainless steel wire (displayed as a NM in the drawing) has better fatigue life compared to the zinc plated high carbon steel wire (displayed as a HC in the drawing).

Therefore, the high tensile stainless steel wire according to the present invention has good stability and reliability that shall reduce the broken wire accident by fatigue.

(5) Wire Strand Test

Figure 7:
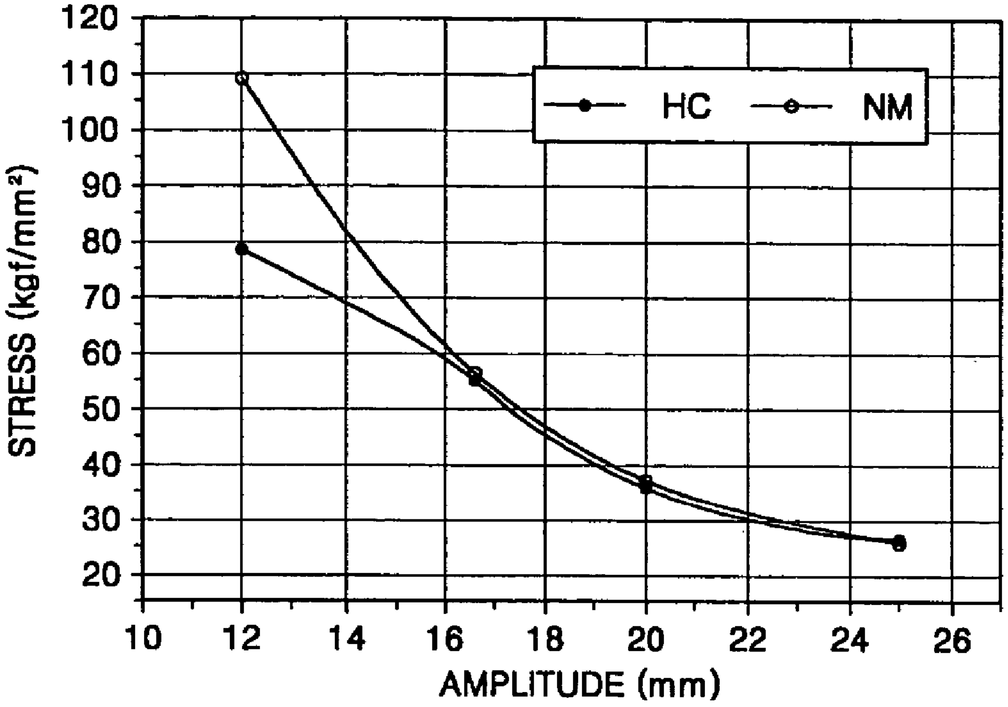
FIG. 7 is a graph illustrating a result of a three-point bending fatigue test of a aluminium-welded high carbon steel wire and a high tensile nonmagnetic stainless steel wire.

FIG. 7 illustrates a three point bending fatigue of a wire strand that is stranded, respectively, with 7 wires of 3.5 mm aluminium-welded high tensile nonmagnetic stainless steel wire and with 7 wires of 3.5 mm aluminium-welded high carbon steel wire.

Referring to FIG. 7, the high tensile nonmagnetic stainless steel wire has a lot better fatigue characteristics compared to the high carbon steel wire, in a 15 mm or less amplitude which can be often occurred by the wind. The former has a similar fatigue characteristics to the latter in a 20 mm or more amplitude.

As a result, the high tensile stainless steel wire has an increased stability and reliability by this remarkable fatigue characteristic compared to the conventional high carbon steel wire with the effect of a reduction of a power loss.

TEST EXAMPLE

First, a solution heat treatment and pickling are applied to the high tensile nonmagnetic stainless steel wire including Fe+C 0.090%, Si 0.53%, Mn 9.76%, Ni 5.55%, Cr 17.59%, Cu 0.18%, Nb 0.12%, and N 0.294% by weight based on the total weight of the steel wire. After a coating treatment, the steel wire is passed through six dies in a continuous wire-drawing machine and is reduced its sectional area up to 3.2 mm (or a percentage reduction in area is 75.8%) by the above wire-drawing. In this case, a tensile strength of a 3.20 mm steel wire is 190.5 kg/mm$^2$ and an elongation ratio is 2.2%.

After degreasing the coating and lubricant on a surface of a 3.2 mm drawn wire, it is extruded to the 3.90 mm wire by aluminium-welding with 0.70 mm thickness. Finally, a 3.50 mm aluminium-welded high tensile stainless steel wire is obtained by wire drawing the above 3.90 mm aluminium-welded wires with 0.62 mm thick.

The 3.50 mm aluminium-welded wire has a 140 kg/mm$^2$ tensile strength, a 3.0% elongation ratio, and a 24% IACS conductivity ratio. These satisfy the standards of the KEPCO, that is the tensile strength of 130 kg/mm$^2$ or more, the elongation ratio of 1.5% or more, and the conductivity ratio of 20.3% IACS.

Then, seven wires of the 3.50 mm aluminium-welded high tensile nonmagnetic stainless steel wire are stranded to make the core of the electric conductor according to the Korean Industrial Standard KS D 7007. Both the core of high tensile nonmagnetic stainless steel wire strand and the conventional high carbon steel wire strand were made into two types of a 410 mm$^2$ overhead electric conductor.

Figure 8:
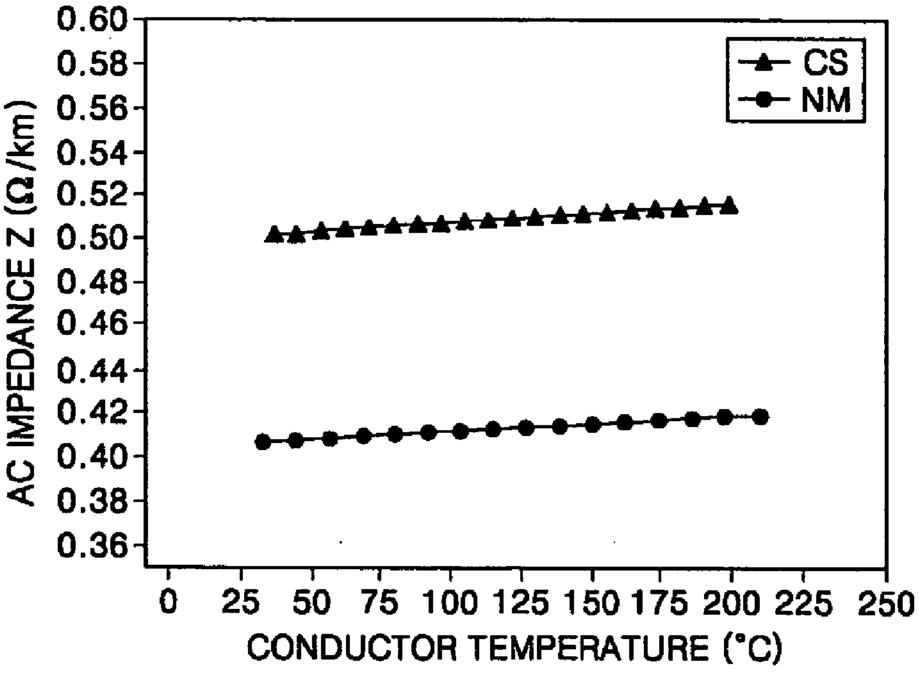
FIG. 8 is a graph illustrating a result of comparing alternating current impedance of an conventional overhead electric conductor with its core of a high carbon steel wire and an low loss overhead electric conductor with its core of a high tensile nonmagnetic stainless steel wire according to a wire temperature.

Using the above two types of the overhead electric conductors, an alternating current impedance characteristic and a loss reduction effect of the high tensile nonmagnetic stainless steel wire in a power transmission are detected. The result is illustrated in FIG. 8.

It can be seen that the alternating current impedance linearly increases as the temperature of the electric conductor is raised, and furthermore the alternating current impedance of an overhead electric conductor made of the aluminium-welded high tensile nonmagnetic steel reinforced (displayed as a NM in the drawing) is dramatically decreased compared to that of an overhead electric conductor made of the aluminium-welded high carbon steel reinforced (displayed as a HC in the drawing).

Figure 9:
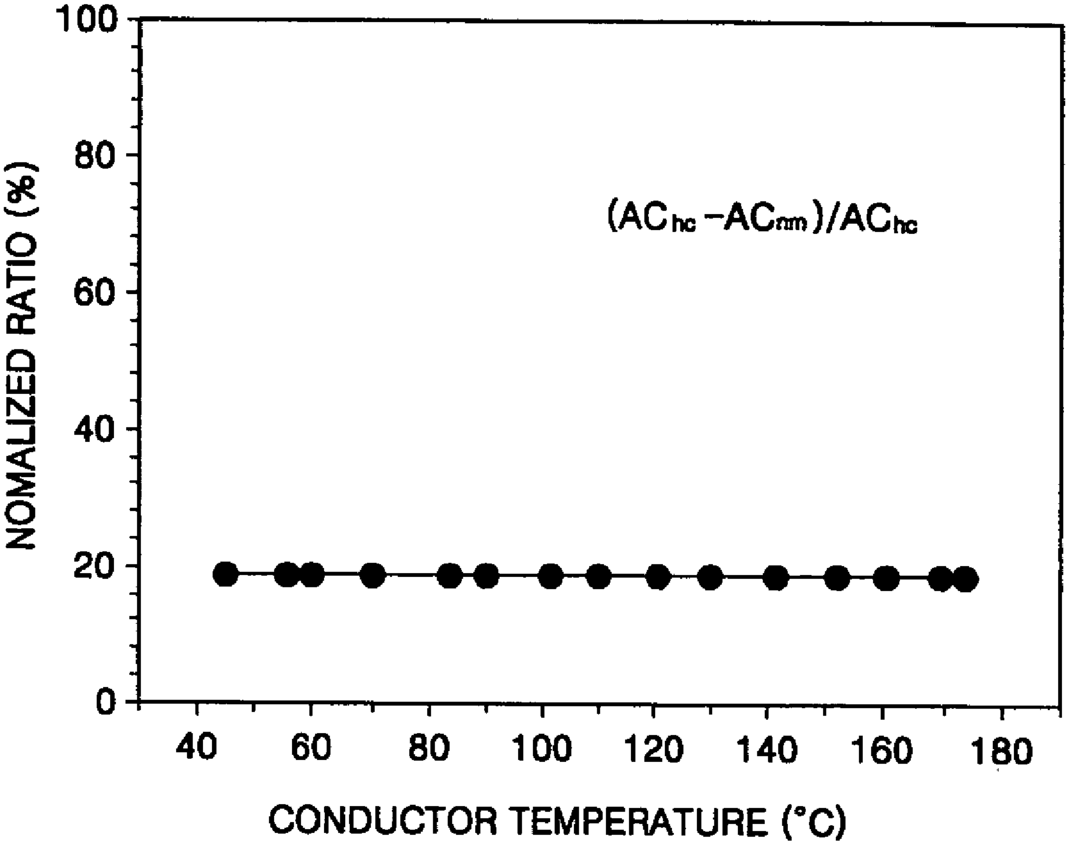
FIG. 9 is a graph illustrating a decrease rate of a power transmission loss of a conventional overhead electric conductor with its core of a high carbon steel wire and an low loss overhead electric conductor with its core of a high tensile nonmagnetic stainless steel wire according to a conductor temperature.

FIG. 9 illustrates a reducing tendency of alternating current impedance values of the overhead electric conductor made of the aluminium-welded high tensile nonmagnetic stainless steel reinforced as a temperature changes. Namely, FIG. 9 illustrates a ratio of difference between AC hc and AC nm to AC hc. Where AC hc represents alternating current impedance values of the overhead electric conductor made of the aluminium-welded high carbon steel reinforced, and AC nm represents alternating current impedance values of the overhead electric conductor made of the aluminium-welded high tensile nonmagnetic stainless steel reinforced.

As described in FIG. 9, the overhead electric conductor made of the aluminium-welded high tensile nonmagnetic stainless steel reinforced has a 20% more efficiency in improving the alternating current resistance than that of the overhead electric conductor made of the aluminium-welded high carbon steel reinforced.

As a result, the overhead electric conductor using the high tensile nonmagnetic stainless steel wire as its core can achieve an effective transmission of electric energy by sharply reducing the core loss and eddy current loss and minimizing the effective electric resistance.

In addition, the stability and reliability of the overhead electric conductor can be dramatically enhanced characterized by the lower temperature increase of electric conductor occurring in power transmission, the corrosion resistance to the corrosive environment such as salt water, and the fatigue resistance of the vibration fatigue with the amplitude 15 mm and less by the wind.

Therefore, the effective use of the electric energy under a lack of energy resources and a stable transmission of the electric energy as an important and basic power source in this high technology era can be achieved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A high tensile nonmagnetic stainless steel wire for a core of a low loss overhead electric conductor, the high tensile nonmagnetic stainless steel wire comprising:

a nonmagnetic stainless steel wire comprising:

0.07 to 0.12% by weight of C;

0.05 to 1.00% by weight of Si;

4.5 to 12.0% by weight of Mn;

16.0 to 19.5% by weight of Cr;

2.5 to 6.0% by weight of Ni;

0.10 to 3.0% by weight of Cu;

0.05 to 0.15% by weight of Nb;

0.20 to 0.40% by weight of N;

0.01 to 0.10% by weight of Al; and the remaining percentage weight of Fe and other inevitable impurities, based on the total weight of the nonmagnetic stainless steel wire, wherein the nonmagnetic stainless steel wire having a tensile strength of 180 kg/mm$^2$ or more, elongation of 2.0% or more, and magnetic permeability of 1.02 μm or less, wherein the high tensile nonmagnetic stainless steel wire core has 7 nonmagnetic stainless steel wires stranded together, which are then welded by an aluminum welding process to a predetermined thickness to reduce eddy current loss in the core and used as the core of the low loss overhead electric conductor; and an aluminum-welded layer of thickness 0.47-0.78 mm formed on an outer surface of the nonmagnetic stainless steel wire, wherein the tensile strength of the nonmagnetic stainless steel wire increases for a constant temperature over time that allows the aluminum-welded layer formed on the outer surface of the nonmagnetic stainless wire to have an increase in thickness from 0.47 mm to 0.78 mm for increase conductivity by eliminating a discharge of Joule heat from the nonmagnetic stainless steel wire.

2. The high tensile nonmagnetic stainless steel wire of claim 1, wherein the high tensile nonmagnetic stainless steel wire is formed of:

substantially 0.090% of C;

substantially 0.053% of Si;

substantially 9.76% of Mn;

substantially 17.59% of Cr;

substantially 5.55% of Ni;

substantially 0.18% of Cu;

substantially 0.12% of Nb; and substantially 0.294% of N by weight based on the total weight of the nonmagnetic stainless steel wire.

* * * * *